(12) United States Patent
Reinhardt

(10) Patent No.: US 8,446,300 B2
(45) Date of Patent: May 21, 2013

(54) TECHNIQUE FOR RATE MATCHING IN A DATA TRANSMISSION SYSTEM

(75) Inventor: Steffen Reinhardt, Nürnberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 211 days.

(21) Appl. No.: 13/056,757

(22) PCT Filed: Jun. 23, 2009

(86) PCT No.: PCT/EP2009/057793
§ 371 (c)(1),
(2), (4) Date: Feb. 8, 2011

(87) PCT Pub. No.: WO2010/012544
PCT Pub. Date: Feb. 4, 2010

(65) Prior Publication Data
US 2011/0134982 A1    Jun. 9, 2011

Related U.S. Application Data

(60) Provisional application No. 61/085,914, filed on Aug. 4, 2008.

(30) Foreign Application Priority Data

Aug. 1, 2008 (EP) .................................... 08013840

(51) Int. Cl.
*H03M 7/00* (2006.01)
(52) U.S. Cl.
USPC .............................................. 341/81; 341/51
(58) Field of Classification Search
USPC .................................................... 341/51, 81
See application file for complete search history.

(56) References Cited

U.S. PATENT DOCUMENTS 6,437,714 B1 *  8/2002  Kim et al. ........................ 341/81
7,027,782 B2 *  4/2006  Moon et al. .................... 455/102

(Continued)

FOREIGN PATENT DOCUMENTS

EP    1114528 A1    7/2001
EP    1324528 A1    7/2003

(Continued)

OTHER PUBLICATIONS

3GPP TS 36.212 V8.3.0 (May 2008), 3rd Generation Partnership Project; Technical Specification Group Radio Access Network; Evolved Universal Terrestrial Radio Access (E-UTRA); Multiplexing and channel coding (Release 8), May 2008.

*Primary Examiner* — Khai M Nguyen
(74) *Attorney, Agent, or Firm* — Coats & Bennett, P.L.L.C.

(57) ABSTRACT

A technique for rate matching a bit stream ($c^{(0-2)}(k)$) output from a channel encoder (102) to a data transmission rate on a physical transmission channel is described. A method embodiment of the technique comprises the steps of determining, at a beginning of a transmission time interval for a transmission of one or more code blocks on the transmission channel, bit positions of interleaver padding bits (dummy and/or filler bits) in an output buffer for buffering the output bits before transmission on the physical transmission channel; storing the determined padding bit positions (114); and determining, based on the stored padding bit positions, positions ($d^{(0-2)}(k)$) of the output bits from the channel encoding stage (102) in the output buffer, wherein the stored padding bit positions are re-used for each of the one or more code blocks.

17 Claims, 10 Drawing Sheets

U.S. PATENT DOCUMENTS

| | | |
|---|---|---|
| 7,200,792 B2 * | 4/2007 | Kim et al. .................... 714/755 |
| 2003/0133497 A1 | 7/2003 | Kinjo et al. |
| 2008/0098273 A1 | 4/2008 | Blankenship et al. |

FOREIGN PATENT DOCUMENTS

| | | |
|---|---|---|
| EP | 1357676 A2 | 10/2003 |
| EP | 1451962 A1 | 9/2004 |
| EP | 1973235 A1 | 9/2008 |
| WO | 2004062113 A1 | 7/2004 |
| WO | 2008154646 A2 | 12/2008 |

* cited by examiner

TECHNIQUE FOR RATE MATCHING IN A DATA TRANSMISSION SYSTEM

TECHNICAL FIELD

The invention relates to a technique for rate matching a bit stream output from a channel encoder to a data transmission rate on a physical transmission channel.

BACKGROUND

Prior to transmitting data on a physical transmission channel the data are typically subjected to channel encoding. For example, mobile terminals conforming to the 3GPP ($3^{rd}$ Generation Partnership Project) LTE (Long Term Evolution) mobile communication standard use either Turbo Coding or Convolutional Coding of rate ⅓ for nearly all physical channels.

In at least one of the downlink direction and the uplink direction of LTE systems, link adaptation will be possible on the physical channels and flexible coding rates will be applied. Therefore, in LTE systems rate matching will be introduced as a mandatory feature between the channel encoding and the actual transmission of the encoded data over the physical channel. The rate matching adapts the number of bits output from the channel encoder to the number of bits that can be transmitted on the physical channel. For example, channel encoded bits may be repeated or redundancy bits may be punctured to fit the capacity of the physical channel.

In LTE, the operations to be performed by the rate matching are prescribed, see e.g. the 3GPP Technical Specification (TS) 36.212. As specified in section 5.1.4 of the TS 36.212, rate matching basically comprises a sub-block interleaving for each of the systematic, parity 1 and parity 2 channel encoder output streams. A bit collection block multiplexes the output of the interleavers and collects the bits in a virtual circular buffer. Bit selection and pruning (i.e. the deletion of zero-bits, which have been inserted at an earlier stage to fill a code block up to a prescribed size or to fill a sub-block interleaver matrix, for example) is then performed on the virtual buffer. In other words, a cyclic read-out of the buffer or a puncturing of redundancy bits is performed in order to adapt the data rate to the capacity of the physical channel.

While the operations to be performed and the output of the rate matching are prescribed for LTE systems as outlined above, the implementation thereof is not. An efficient implementation has to take account of the fact that the rate matching introduces some latency in the data transmission process, which should be minimized. Further, any additional memory usage required for the rate matching should be minimized.

SUMMARY

There is a demand for an implementation of a rate matching stage which is efficient in terms of latency introduced by the rate matching and memory usage.

This demand is satisfied by a method for matching an amount of output bits from a channel encoding stage to a bit transmission rate of a physical transmission channel. The method comprises the steps of determining, at a beginning of a transmission time interval for a transmission of one or more code blocks on the transmission channel, bit positions of interleaver padding bits in an output buffer for buffering the output bits before transmission on the physical transmission channel; storing the determined padding bit positions; and determining, based on the stored padding bit positions, positions of the output bits from the channel encoding stage in the output buffer, wherein the stored padding bit positions are re-used for each of the one or more code blocks.

The method may be performed in a mobile terminal for uplink communication with a mobile network or may be performed in a radio base station of a mobile network for downlink communication. The mobile network may be an LTE network.

The padding bits may comprise at least one of dummy bits inserted by an interleaver in the rate matching stage and filler bits inserted for an interleaver in the channel encoding stage. For example, in an LTE environment, the dummy bits may be inserted by one or more sub-block interleavers and the filler bits may have been inserted for an interleaver within the channel encoding stage.

In one implementation, the step of storing the padding bit positions comprises storing a first set of padding bit positions including only the dummy bit positions and a second set of padding bit positions including both the dummy bit positions and the filler bit positions. In one variant of this implementation, the padding bit positions are stored in the following way: Each bit stream (systematic bit stream, parity 1 bit stream, parity 2 bit stream) is divided into a predefined number of sections, e.g. 32 sections. As the padding bits are located at the beginning of each section, only the number of padding bits per section needs to be stored. The positions of the padding bits can be derived therefrom.—The step of determining the positions of output bits from the channel encoding stage may then comprise determining positions of bits of a systematic bit stream and a parity 1 bit stream using the second set of padding bit positions and determining positions of bits of a parity 2 bit stream using the first set of padding bit positions.

The step of determining the positions of output bits from the channel encoding stage may comprise pruning at least one of the padding bits from the output buffer in order to match the data rate on the physical channel.

In one realization, the output buffer is a circular buffer and the step of determining the positions of the output bits comprises determining a start position for reading out the circular buffer based on a redundancy version of the transmission and the stored padding bit positions. A cyclic read out may be performed on the circular buffer based on the redundancy version of the transmission. For example, in case a code rate is below ⅓ for transmitting a systematic, parity 1 and parity 2 bit stream, no additional bits need to be stored, but the cyclical read can be performed.

The above-mentioned demand is further satisfied by a method for matching an amount of output bits from a channel encoding stage to a bit transmission rate of a physical transmission channel. The method comprises the steps of receiving an output triple of bits from the channel encoding stage; and determining bit positions for each bit of the output triple of bits in an output buffer for the physical transmission channel. The step of determining the bit positions is performed such that the bit positions are available when receiving the output triple. For example, the step of determining the bit positions may be performed in parallel to the channel encoding of the output triple of bits.

The step of determining bit positions may comprise determining bit positions in at least one of a virtual circular output buffer and a physical output buffer. The virtual circular output buffer may be larger in size than the physical output buffer.

One implementation of the second method may comprise the further step of determining for each bit position if the bit position falls within a physical output buffer for the transmission on the physical transmission channel. This determination may be performed before or after the output triple of bits is received. Each bit of the output triple may be stored at the respective determined position in the physical output buffer if the position falls within the physical output buffer. Otherwise, the bit may be discarded.

The first and second method as summarized above may also be combined, i.e. the second method may be performed one or more times subsequently to the first method. For example, the steps of the first method related to the determination and storing of the padding bit positions may be performed once at the beginning of a TTI, while the step of determining output bit positions based on the stored padding bit positions of the first method and the steps of the second method may be performed repeatedly during the TTI, i.e. once for each of the code blocks to be transmitted in the TTI.

The above demand is further satisfied by a first rate matching device adapted for matching an amount of output bits from a channel encoding stage to a bit transmission rate of a physical transmission channel. The first rate matching device comprises a first component adapted to determine, at a beginning of a transmission time interval for a transmission of one or more code blocks on the transmission channel, bit positions of interleaver padding bits in a virtual output buffer for transmitting the output bits on the physical transmission channel; a second component adapted to store the determined padding bit positions; a third component adapted to determine, based on the stored padding bit positions, positions of the output bits from the channel encoding stage in the virtual output buffer, wherein the stored padding bit positions are re-used for each of the one or more code blocks.

The above demand is still further satisfied by a second rate matching device adapted for matching an amount of output bits from a channel encoding stage to a bit transmission rate of a physical transmission channel. The second rate matching device comprises a first component adapted to receive an output triple of bits from the channel encoding stage; and a second component adapted to determine bit positions for each bit of the output triple of bits in an output buffer for the physical transmission channel; wherein the first and second components are adapted such that the determination of the bit positions is performed such that the bit positions are available when receiving the output triple.

To meet the above-mentioned demand, a third rate matching device may comprise the components of both the first and second rate matching devices as summarized above. Any one of the first, second or third rate matching device may be included in a mobile terminal or a radio base station of a mobile network.

BRIEF DESCRIPTION OF THE DRAWINGS

In the following, the invention will further be described with reference to exemplary embodiments illustrated in the figures, in which.

DETAILED DESCRIPTION OF PREFERRED EMBODIMENTS

In the following description, for purposes of explanation and not limitation, specific details are set forth, for example related to a rate matching stage implemented in a mobile terminal for communication with an LTE network, in order to provide a thorough understanding of the current invention. It will be apparent to one skilled in the art that the current invention may be practiced in other embodiments that depart from these specific aspects. For example, the skilled artisan will appreciate that the current invention may be practiced also in a radio base station (e.g., an evolved Node B of an LTE network). More generally, the proposed implementations of a rate matching stage may not only be applied to transmitters in an LTE network, but may in fact be applied to transmitters in any kind of wireless or wired data communication environment, in which a channel encoding output has to be flexibly adapted to a data rate of a physical channel.

Those skilled in the art will further appreciate that functions explained herein below may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the steps of the methods disclosed herein when executed by the processor.

Figure 1:
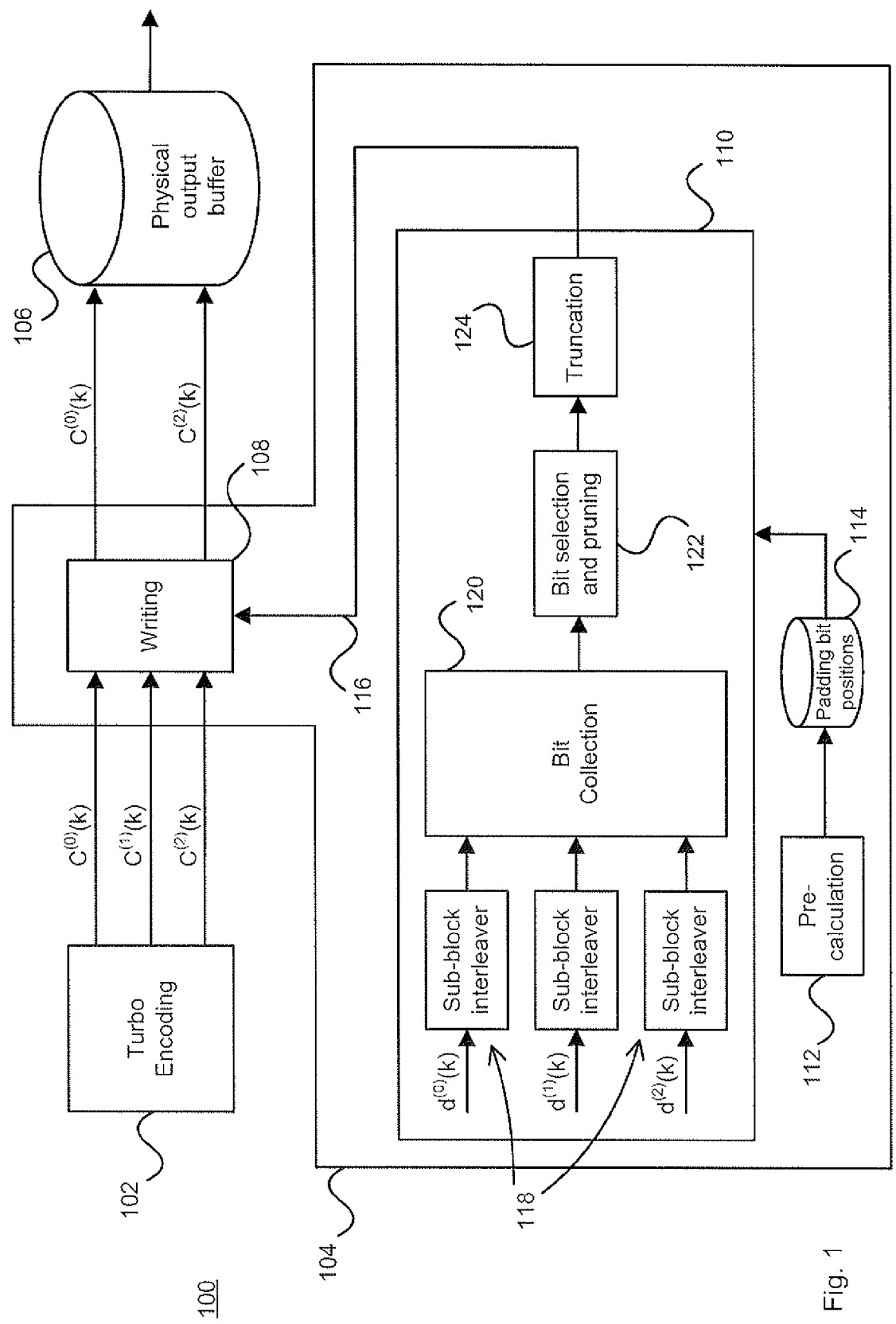
FIG. 1 schematically illustrates an embodiment of a rate matching stage.

FIG. 1 illustrates an embodiment of a transmitter 100 comprising a Turbo Encoder 102 representing a channel encoding stage, a rate matching stage 104, and a physical output buffer 106. It is exemplarily assumed in the following that the transmitter 100 is implemented in a mobile terminal adapted for communication with an LTE mobile network. The data stored in the physical output buffer 106 is transmitted on a physical uplink channel of a radio interface of the LTE network.

Instead of the Turbo Encoder 102 exemplarily referred to in the following discussion, in other embodiments a Convolutional Encoder may be provided for the channel encoding. There are subtle differences between turbo encoding and convolutional encoding. For example, a cyclic shift of one element in the parity 2 bit stream is only performed by a turbo encoder, not by a convolutional encoder. However, these differences are not of central importance for the features and advantages of the techniques described herein. Therefore, if not stated explicitly otherwise, any of the described techniques may be applied in conjunction with either one of turbo encoding or convolutional encoding.

Generally, for LTE the channel encoding may be performed for each transmission time interval (TTI) regardless of the current redundancy version of the corresponding HARQ (Hybrid Repeat ReQuest) process. This is due to memory saving reasons, as performing the channel encoding only once for each HARQ process would require a memory in the transmitter which is large enough to store as many encoded transport blocks as the number of HARQ processes which are used.

The systematic bit ($c^{(0)}(k)$), parity 1 bit ($c^{(1)}(k)$) and parity 2 bit ($c^{(2)}(k)$) output by the Turbo Encoder 102 for each time instance k are provided to a writing component 108 controlled by the rate matching stage 104. The component 108 writes the output triple of bits $c^{(0-2)}(k)$ into the physical output buffer 106 (in order to illustrate an example described further below, the process of writing the output bit $c^{(1)}(k)$ to the buffer 106 is indicated by a dashed arrow only).

The rate matching stage 104 comprises the writing component 108, a bit position determination component 110 and a pre-calculator 112. An operation and interworking of the various components of the rate matching stage 100 will be described with reference to FIGS. 2-5 below. Generally, the determination component 110 is configured to control the writing component 108 such that the bits output by the Turbo Encoder 102 are written directly to the correct positions in the physical output buffer 106 without any intermediate buffering. In case the Turbo Encoder 102 is started new for each transmission time interval (TTI), it is generally not required to save all output bits from the Turbo Encoder 102, but only those bits that will actually be transmitted for the current redundancy version; the remaining bits may be discarded. Further, the output buffer 106 may be implemented as a cyclical buffer; in case of a code rate smaller than ⅓, the buffer can then be read out cyclically.

Figure 2:
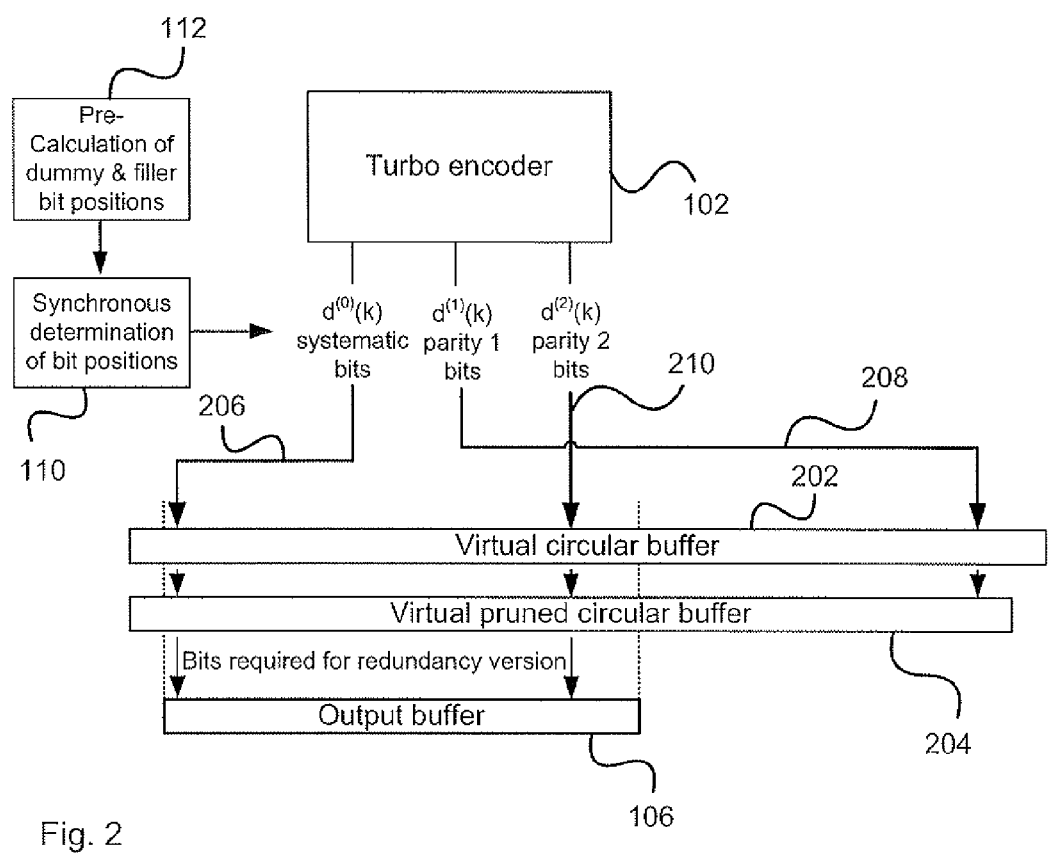
FIG. 2 provides an overview of the interworking of some of the components of the rate matching stage of FIG. 1.

FIG. 2 schematically illustrates a principle of operation of the pre-calculator 112 and the bit position determination component 110. The positions $d^{(0-2)}(k)$ of the systematic, parity 1 and parity 2 bits $c^{(0-2)}(k)$ output by the turbo encoder 102 are virtually manipulated in the determination component 110 for each time instance k, at which an output triple is received from the turbo encoder. The position determination is performed synchronous to the channel encoding, i.e. the correct bit positions in the physical output buffer 106 are available at the time the bits $c^{(0-2)}(k)$ are output by the encoder 102.

The determination component 110 operates, following the prescription given in the TS 36.212, to calculate the positions in a virtual circular buffer 202. Then, a virtual pruning is performed, i.e. dummy and filler bits included in the data due to an interleaving in the channel encoding stage and the rate matching stage are punctured. The pruning results in a virtual pruned circular buffer 204. Eventually, the bit positions required for the current redundancy version are taken from the virtual pruned circular buffer 204 and the writing component 108 (see FIG. 1) is instructed to write the bits $c^{(0-2)}(k)$ to the positions as indicated by $d^{(0-2)}(k)$ after the virtual position determination operations have been performed as outlined above.

Arrows 206, 208, and 210 in FIG. 2 exemplarily illustrate the position of a particular systematic bit, parity 1 bit and parity 2 bit, respectively. Due to the interleaving in the rate matching stage (see further below), there may be a considerable change in the relative positions of the bits with respect to each other. In the depicted example, the parity 1 bit (arrow 208) is shifted to a position after the parity 2 bit (arrow 210) in the virtual buffer 202. As only a small amount of redundancy is required for the current transmission, only a small portion of the virtual buffer is required for the actual output buffer 106 and therefore the parity 1 bit is discarded from the transmission, as it is not required for the current redundancy version. The resultant situation is also depicted in FIG. 1, where it is shown that only the bits $c^{(0)}(k)$ and $c^{(2)}(k)$ (indicated by solid arrows) are stored in the output buffer 106, while the bit $c^{(1)}(k)$ is not (indicated by the dashed arrow; in other examples, any other combination of one or more of the bits $c^{(0-2)}(k)$ may of course be written to the buffer).

The pre-calculator 112 illustrated in FIGS. 1 and 2 operates to pre-calculate the positions of dummy and filler bits in a virtual circular buffer 202. Basically, the term 'dummy bits' as used herein denotes padding bits inserted at the beginning of a data vector in case the number of input bits from the channel encoding do not fit to the prescribed format of the rate matching internal interleavers. The term 'filler bits' intends to denote bits inserted by the Turbo Encoding due to a turbo encoding internal interleaving (in convolutional encoding, no filler bits are inserted). The dummy and filler bits in the systematic and parity 1 bit streams may be punctured in order to fit the data rate of the physical transmission channel. The filler bits in the parity 2 bit stream are not pruned, because due to an internal interleaving one or more filler bits are not the first input bits to a secondary convolutional coding within the turbo encoder 102.

Figure 3:
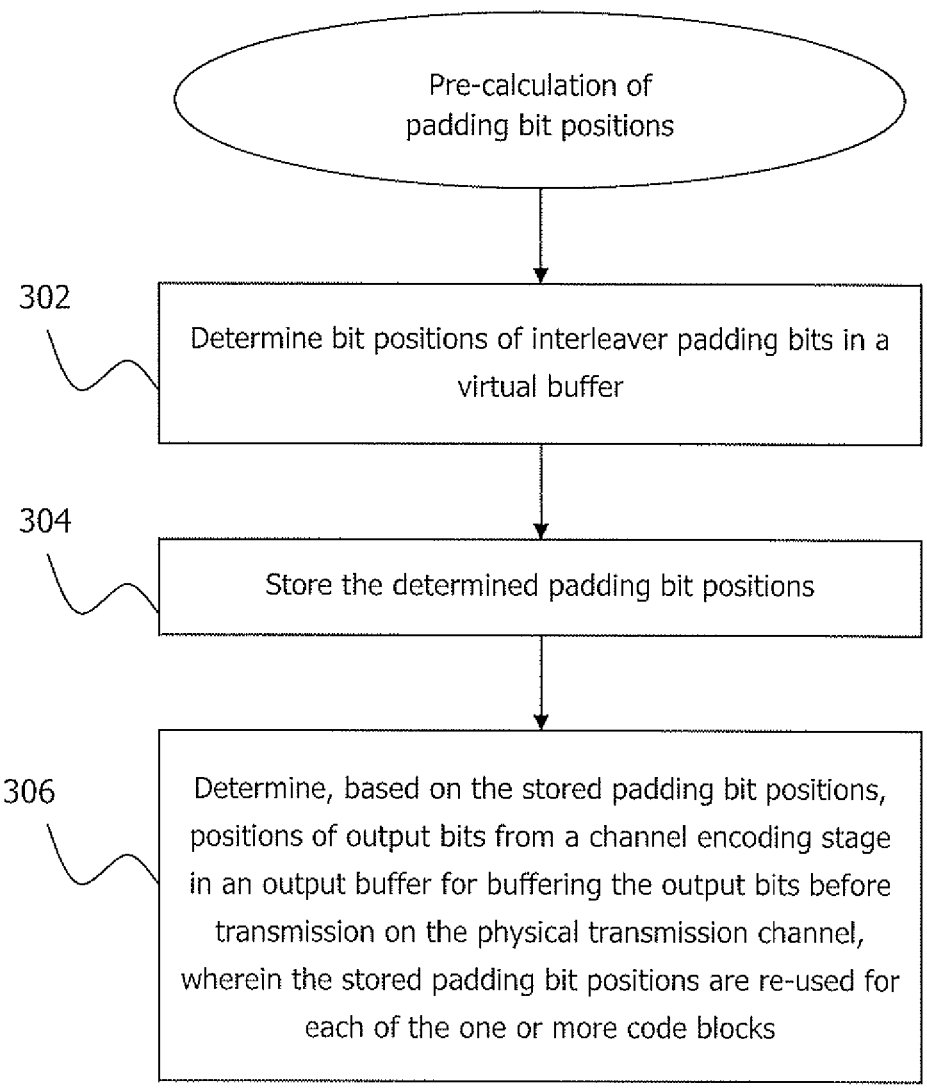
FIG. 3 is a flow diagram illustrating a first operational aspect of the rate matching stage of FIG. 1.
Figure 7:
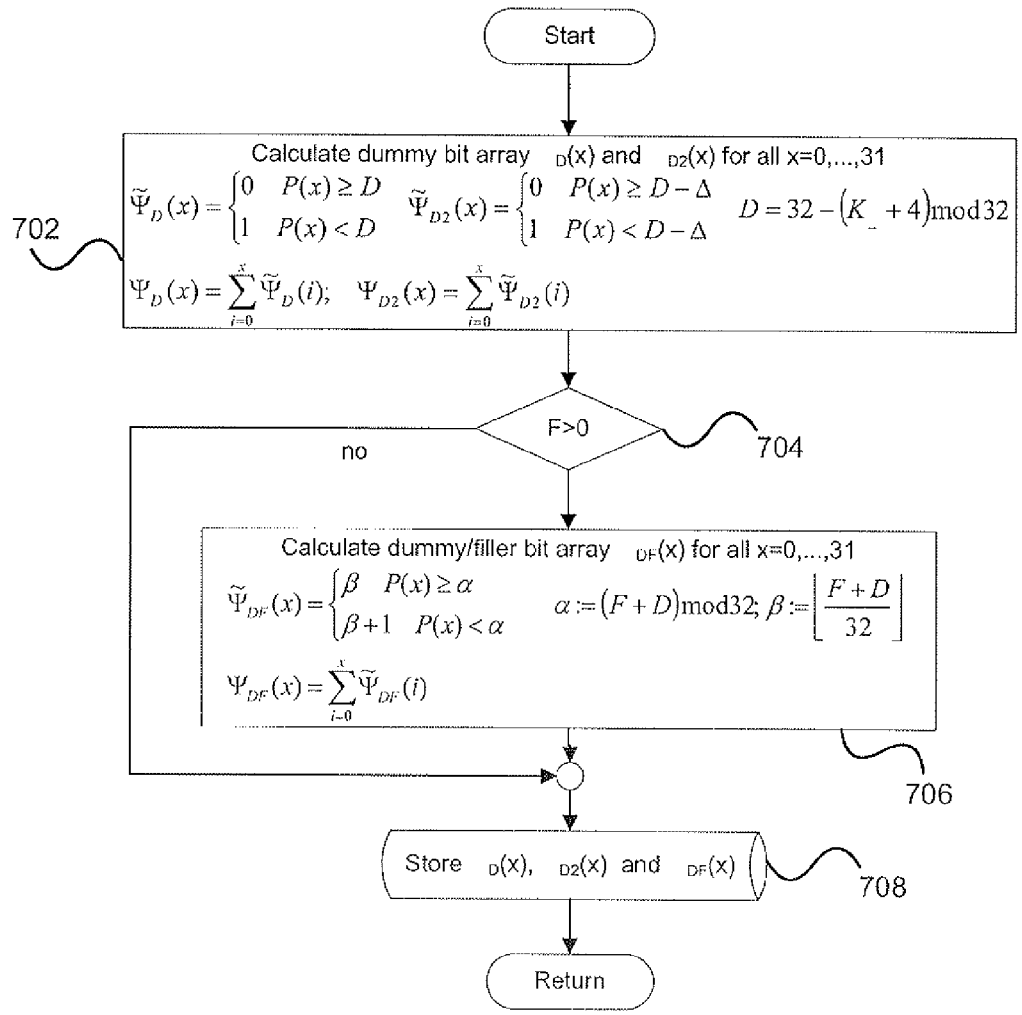
FIG. 7 is a flow diagram illustrating in further detail the step 602 depicted in FIG. 6.

FIG. 3 illustrates in more detail a method embodiment of the pre-calculation of the padding bit positions (see also FIG. 7, which is described in detail below). In step 302, the component 112 in the rate-matching stage 100 of FIG. 1 operates to determine the positions of interleaver padding bits in the virtual circular buffer 202 of FIG. 2. The step 302 may be performed at the beginning of each TTI. In particular, the pre-calculator 112 performs two calculations each resulting in a data record representing a set of position indications for the dummy/filler bits in the virtual circular buffer 202. One of these records contains only indications of the positions of the dummy bits. The second data record contains indications of both, dummy and filler bits. In an embodiment in which convolutional coding is performed in the channel encoding stage, only the first data record needs to be provided. In case turbo encoding is used as the channel encoding method, as in the example illustrated here, the first array is used for the parity 2 stream only and the second array is used for the systematic and parity 1 stream.

In step 304, the pre-calculator 112 operates to store the first and second data records in the buffer 114. In this way, the data records are available for the determination component 110 for all code-blocks to be operated upon in one TTI, i.e. the stored data records are re-used for all code blocks to be transmitted within the corresponding TTI.

In step 306, the determination component 110 operates to determine positions d(k) of the bits c(k) output from the channel encoding stage 102 in the virtual circular buffer 202 based on the data records stored in the buffers 114 and 116.

Figure 4:
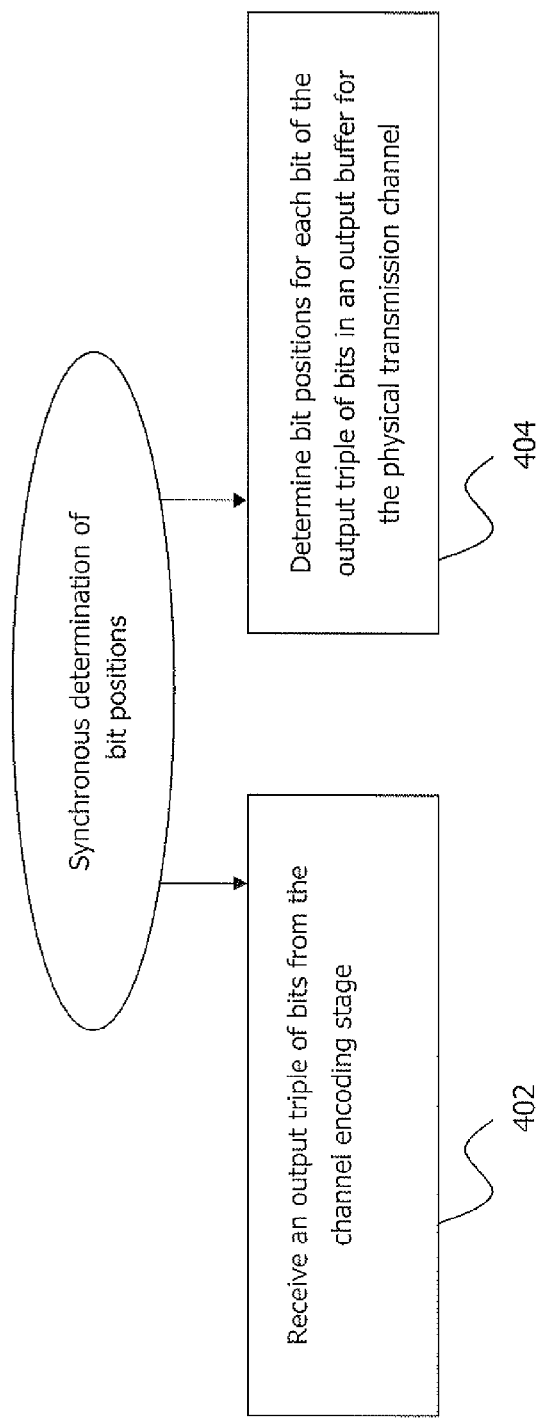
FIG. 4 is a flow diagram illustrating a second operational aspect of the rate matching stage of FIG. 1.

The schematic diagram of FIG. 4 describes in more detail the bit position determination performed in the rate matching stage 104. In step 402, the output triple of bits $c^{(0-2)}(k)$ is received from the Turbo Encoder 102 at the writing component 108. At this time, the component 108 receives a control signal 116 from the determination component 110 indicating a position d(k) for each of the bits in the physical output buffer 106. In case no position is indicated, the corresponding bit has to be discarded, i.e. is not written by the component 108 to the physical output buffer 106. With regard to the time instance exemplarily illustrated in FIG. 2, the control signal 116 may comprise an indication for bit positions $d^{(0)}(k)$ and $d^{(2)}(k)$ but no indication for $d^{(1)}(k)$, such that the bit $c^{(1)}(k)$ will be discarded.

In order to be able to deliver the control signal 118 comprising 0 to 3 indications for the bit positions d(k) synchronously to the reception of the triple of bits $c^{(0-2)}(k)$ for each time instance k, the determination component 110 operates in parallel to the channel encoding in the component 102.

The step 404 may comprise the step 306 of determining address positions in the virtual circular buffer 202, and may further comprise the steps of determining bit positions in the virtual pruned circular buffer 204 and determining the bit positions in the physical output buffer 106.

Figure 5:
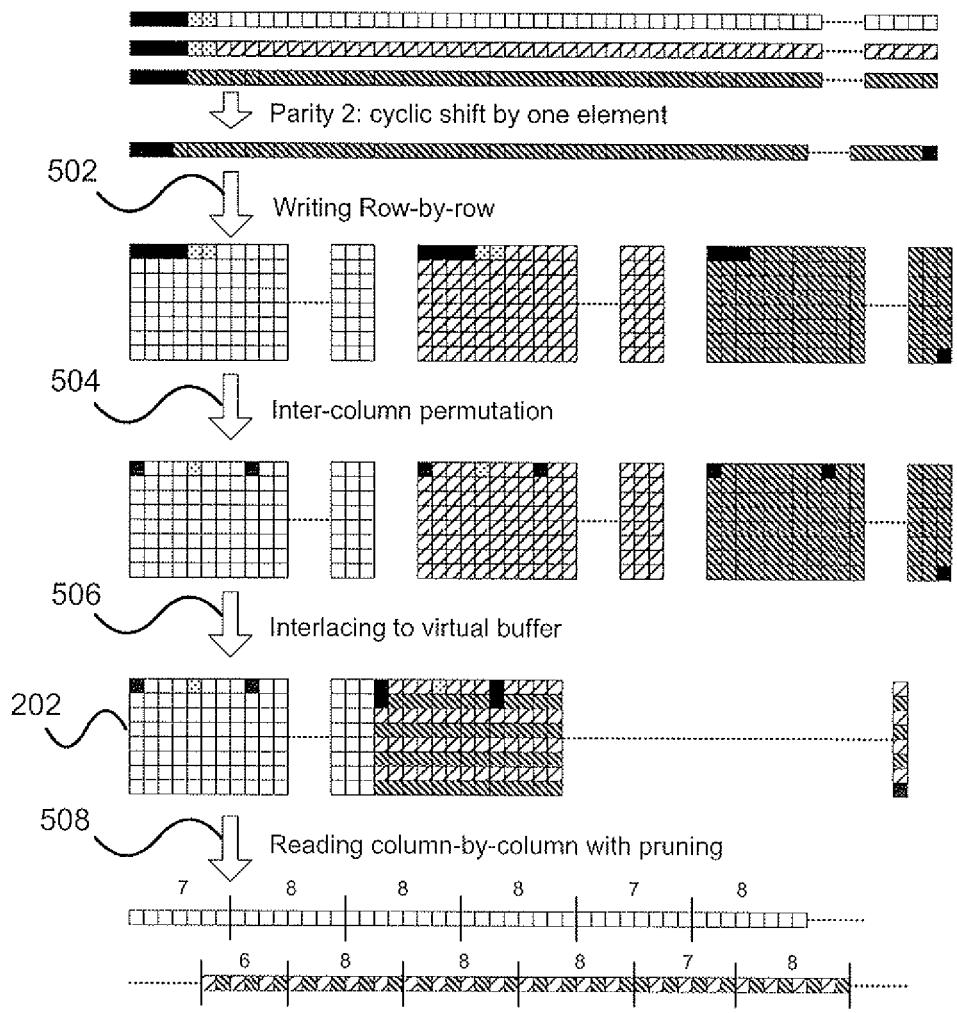
FIG. 5 illustrates a functionality of the rate matching stage of FIG. 1.

With reference to FIGS. 1 and 5, an exemplary operation of the determination component 110 will now be described. The determination component 110 is adapted to virtually perform the address operations prescribed by the 3GPP TS 36.212 for the rate-matching stage, see chapter 5.1.4. For this purpose, the determination component may be seen as virtually comprising sub-block interleavers 118, a bit collection multiplexer 120, a bit selection and pruning component 122 (see FIG. 5.1.4-1 for the turbo coding and FIG. 5.1.4-2 for the convolutional coding in the TS 36.212), and a truncation component 124. The components 118-124 are denoted with dashed lines in FIG. 1, since only the bit positions resulting from an operation of these components are to be determined, i.e. these components may not actually be implemented in form of separate hardware and/or software entities. The calculation of the bit positions as well as the pruning according to the rate matching may thus be performed by virtual address operations without actually re-storing any of the bits output by the channel encoder 102 except from storing the bits in the output buffer 106 (or discarding the bits).

FIG. 5 illustrates results of the virtual operations of the components 118 to 124 on systematic, parity 1 and parity 2 bit sequences for a code block output from the turbo encoder 102. The interleavers 120 virtually perform the operation 502 of writing each of the bit streams row-by-row and the operation 504 of performing an inter-column permutation. Then, the virtual bit collection component 120 performs operation 506 of interlacing the three interleaver matrices generated by the sub-block interleavers 118. In this way, the virtual circular buffer 202 is formed. The bit collection and pruning component 122 virtually performs the operation 508 of reading column-by-column the virtual circular buffer 202 and thereby pruning dummy and filler bits, i.e. the dummy and filler bits are punctured as required to match a data rate on the physical transmission channel. The operation of the component 122 leads to the virtual pruned circular buffer 204 illustrated in FIG. 2.

As can be seen from FIG. 5, while the dummy and filler bits are added by the interleaving at the beginning of a sequence, after the operations 502 to 506 the dummy and filler bits are distributed all over the virtual circular buffer 202. The step 508 makes use of the pre-calculated bit positions of the dummy and filler bits stored in the buffer 114. Eventually (not shown in FIG. 5), the truncation component 124 truncates the virtual pruned circular buffer 204 to arrive at the bit positions of those bits needed for the current redundancy version, i.e. the bit positions in the physical output buffer 106. The bits not required for the current redundancy version are discarded. The corresponding control signal 118 is than provided to the writing component 108.

For the sake of clarity the operation of the bit position determination component 110 is illustrated in FIG. 5 such that the positions of all bits of a code block output from the turbo encoding are determined at once. While this would require that the component 110 is used only once per code block, a buffer would be required to store the bit positions per code block. In case additional buffer space is to be minimized, the bit position determination component 110 may be configured to be executed for each output triple of bits $c^{(0-2)}(k)$ and to only determine the three corresponding bit positions $d^{(0-2)}(k)$. No additional buffer space is then needed, as the positions $d^{(0-2)}(k)$ are immediately used (control signal 116) for writing the bits $c^{(0-2)}(k)$ to the physical output buffer 106.

Figure 6:
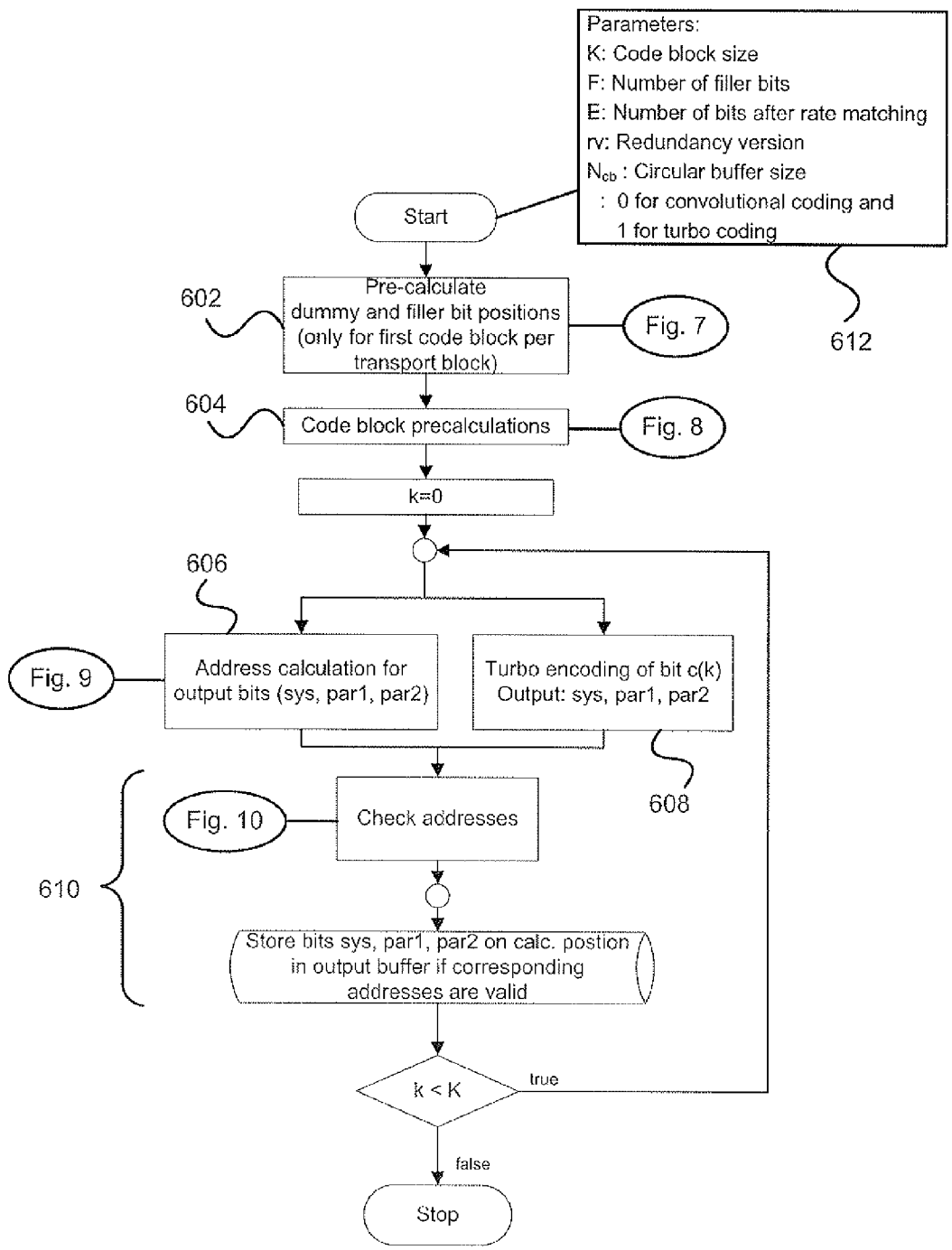
FIG. 6 is a flow diagram illustrating a third operational aspect of the rate matching stage of FIG. 1.

FIG. 6 is a flow diagram providing an overview of the operation of the rate matching stage 110 and the components thereof. Operational details are depicted in FIGS. 7-10, as indicated by the corresponding references in FIG. 6. The sequence illustrated in FIG. 6 may be performed once per TTI.

In step 602, the pre-calculation of dummy and filler bit positions is performed as described in detail with regard to FIG. 3, steps 302 and 304. An elaborated implementation example is also given in FIG. 7. As has been described above with reference to step 302 in FIG. 3, two data records have to be provided by the pre-calculation in step 602 of FIG. 6: one of these records contains position indications of dummy bits, the second record contains indications of dummy and filler bits. Referring in detail to FIG. 7, in step 702 the data record containing only the dummy bit position indications is calculated and is provided as a dummy bit array $N_D(x)$ for each of 32 sections of bit streams. In case the parameter F for indicating the number of filler bits (see box 612 in FIG. 6) indicates a value above 0 (i.e., the rate matching stage follows a turbo encoding) it is decided in step 704 to additionally determine the second data record comprising position indications for both the dummy and the filler bits in the form of a dummy/filler bit array $N_D F(x)$ for all 32 sections. In step 708, which corresponds to step 304 in FIG. 3, the calculated bit arrays are stored for access by the bit position determination component 110.

Figure 8:
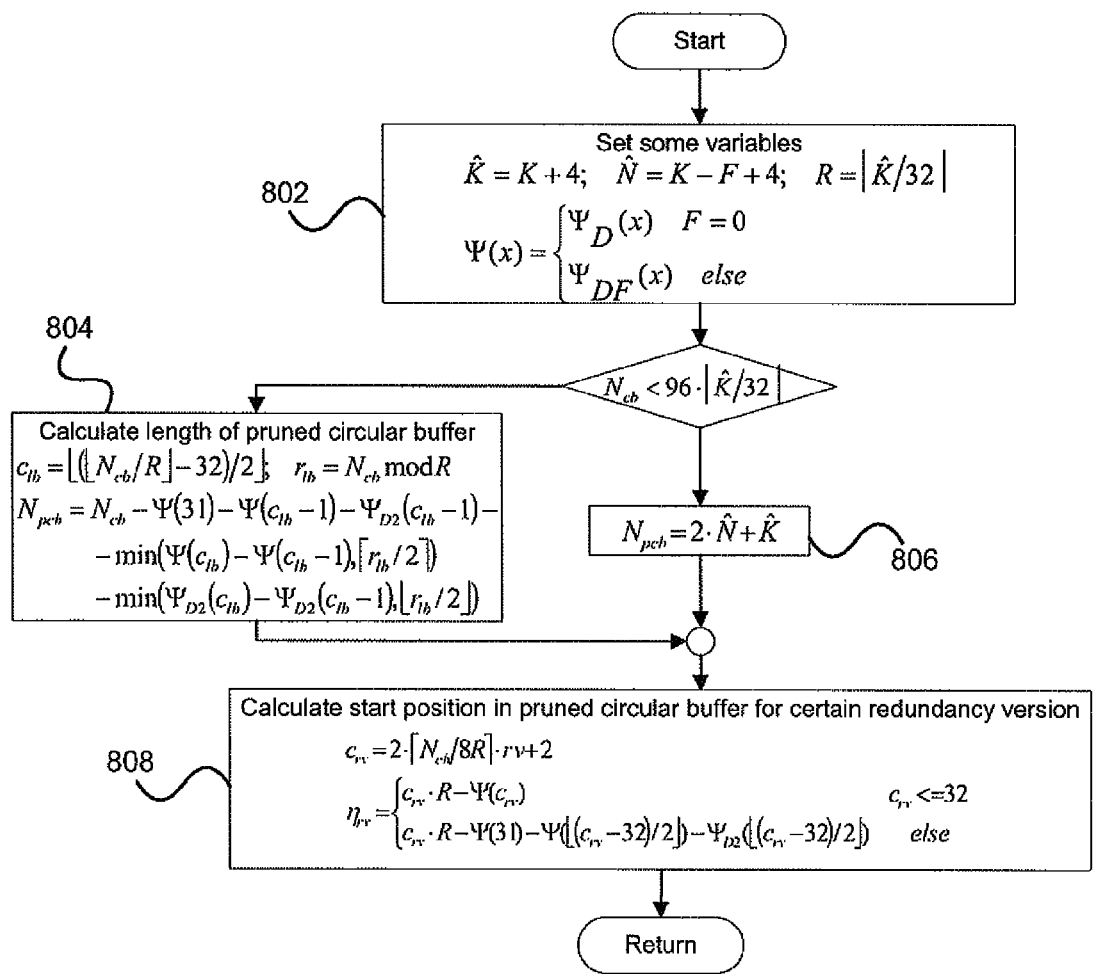
FIG. 8 is a flow diagram illustrating in further detail the step 604 depicted in FIG. 6.
Figure 9:
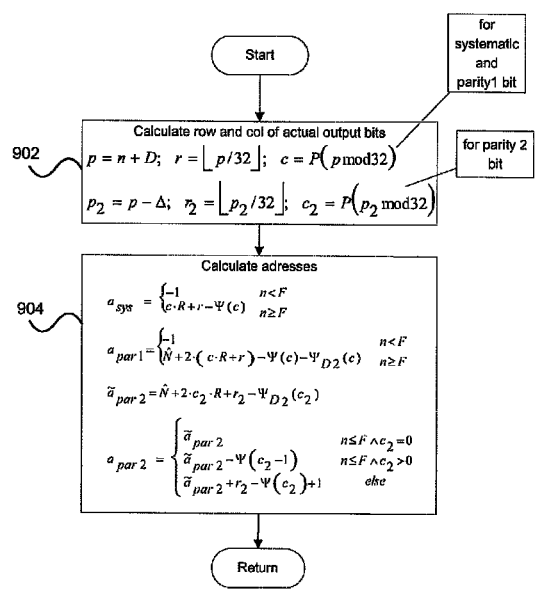
FIG. 9 is a flow diagram illustrating in further detail the step 606 depicted in FIG. 6.

The dummy (and possibly filler) bit positions may have to be calculated only for the first code block per transport block in case this first code block comprises the dummy (and possibly filler) bits. In step 604 in FIG. 6, some code block pre-calculations are performed. A worked example for these pre-calculations is illustrated in FIG. 8. Miscellaneous variables are prepared in step 802 as required for the subsequent calculations. The length $N_{pcb}$ of the pruned circular buffer is calculated in one of steps 804 or 806 depending on the available length $N_{cb}$ of the circular buffer before pruning. In step 808, the start position in the pruned virtual circular buffer is calculated for the current redundancy version of a HARQ transmission.

For each of at least one code-block and each of K triples of bits (time instance k=0, . . . , K−1) of a code-block, the steps 606, 608 and 610 are performed. The step 608 relates to the turbo encoding performed by the component 102 of FIG. 1. The steps 606 and 610 relate to the bit position determination for the output bits c(k). Step 606 has been described in detail with reference to FIG. 4, step 404 and FIG. 5. In particular, step 606 may comprise the operation of the virtual components 118, 120 and 122. The address calculation of systematic, parity 1 and parity 2 output bits is in further detail illustrated by the example of FIG. 9. In step 902, row and column for each of the currently calculated output triple of bits is calculated. In step 904, the addresses for each of the systematic, parity 1 and parity 2 bits are calculated. In this step, the pre-calculated (FIG. 7) dummy and filler bit positions enter the calculation.

Figure 10:
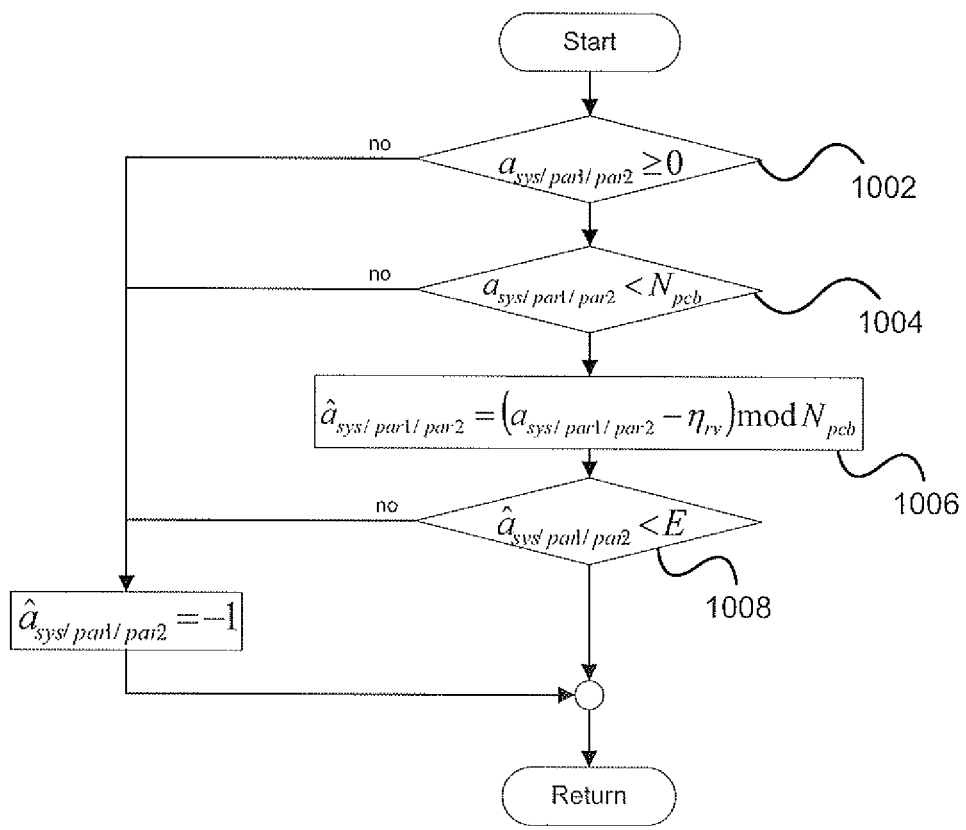
FIG. 10 is a flow diagram illustrating in further detail the step 610 depicted in FIG. 6.

Step 610 illustrates the operation of the component 124 of FIG. 1 related to the determination of whether the bit position calculated for the bit c(k) is valid or whether the bit should be discarded (i.e., whether the bit lies within the physical output buffer 106 of FIG. 2). In case the position is valid, the writing component 108 is instructed to store the bit c(k) on the calculated position in the output buffer 106. Otherwise, no instruction is sent to the component 108, such that the corresponding bit is discarded. A detailed example for the process of checking whether the calculated addresses are valid is depicted in FIG. 10. In steps 1002 and 1004, it is determined whether the calculated address falls within the size $N_{pcb}$ of the pruned circular buffer 204 in FIG. 2. In steps 1006 and 1008, it is determined whether the address position is required for the current redundancy version. If any of these conditions fails, an indicator a is set to indicate that the corresponding bit is not to be stored in the output buffer 106.

The steps 608 and 610 are performed in parallel for each bit of the output triple of bits $c^{(0-2)}(k)$ from the systematic, parity 1 and parity 2 bit streams. Further, it is illustrated in FIG. 6 that the steps 606 and 608 are performed in parallel, while the step 610 is performed after the turbo encoding step 608 has finished. In other embodiments, both steps 606 and 610 are performed in parallel to the channel encoding step 608, such that it is known at the time of output of the turbo encoded bits whether the bit is to be included in the physical output buffer (and at which position) or whether the bit is to be discarded.

The technique proposed herein allows minimizing a latency time introduced due to a rate-matching stage between a channel encoding and a data transmission on a physical channel. The latency can be reduced by performing a determination of bit positions for the bits output by the channel encoding at least partly in parallel to the channel encoding. In case the calculation of the bit positions is performed based on virtual (pruned) circular buffers, no time-consuming memory operations for restoring bits are required, which also reduces a latency time. Moreover, the pre-calculation of padding bit positions may further accelerate and simplify the determination of bit positions in a virtual circular output buffer, further reducing the latency at the cost of only small buffer space needed for storing the padding bit positions.

The technique described herein furthermore allows to minimize memory space required by a rate matching. The determination of the bit positions may be performed synchronously for each of a sample of bits output at a time instance k by the channel encoder, for example for a triple of bits output from a systematic bit stream, parity 1 bit stream and parity 2 bit stream, such that the positions of these bits are available just in time. No extra buffer is needed for storing these bit positions, because the bits are immediately written to the output buffer for the physical channel transmission.

Further, the techniques presented here also allow a combination of the bit position determination for rate matching with channel interleaving (e.g., in the uplink) and/or data/control multiplexing, which typically requires additional address operations. Performing these mechanisms in combination allows to further optimize a memory usage.

While the current invention has been described in relation to its preferred embodiments, it is to be understood that this description is for illustrative purposes only. Accordingly, it is intended that the invention be limited only by the scope of the claims appended hereto.

The invention claimed is:

1. A method for matching an amount of output bits from a channel encoding stage to a bit transmission rate of a physical transmission channel, the method comprising:
   determining, at the beginning of a transmission time interval for a transmission of one or more code blocks on the physical transmission channel, bit positions of interleaver padding bits in an output buffer that buffers the output bits before transmission on the physical transmission channel;
   storing the determined padding bit positions; and
   determining, based on the stored padding bit positions, positions of the output bits in the output buffer, wherein the stored padding bit positions are re-used for each of the one or more code blocks.

2. The method according to claim 1, wherein the method is implemented by a rate matching stage, and wherein the padding bits comprise at least one of:
   dummy bits inserted by an interleaver that is included in the rate matching stage; and
   filler bits inserted for an interleaver that is included in the channel encoding stage.

3. The method according to claim 2, wherein storing the padding bit positions comprises storing a first set of padding bit positions including only the dummy bit positions and a second set of padding bit positions including both the dummy bit positions and the filler bit positions.

4. The method according to claim 3, wherein determining the positions of the output bits comprises determining positions of bits of a systematic bit stream and a parity 1 bit stream using the second set of padding bit positions and determining positions of bits of a parity 2 bit stream using the first set of padding bit positions.

5. The method according to claim 1, wherein determining the positions of the output bits comprises pruning at least one of the padding bits from the output buffer.

6. The method according to claim 1, wherein the output buffer is a circular buffer and wherein determining the positions of the output bits comprises determining a start position for reading out the circular buffer based on a redundancy version of the transmission and the stored padding bit positions.

7. A method for matching an amount of output bits from a channel encoding stage to a bit transmission rate of a physical transmission channel, the method comprising:
   receiving an output triple of bits from the channel encoding stage; and
   determining bit positions for each bit of the output triple in an output buffer for the physical transmission channel, wherein the determined bit positions are available when receiving the output triple.

8. The method according to claim 7, wherein determining the bit positions is performed in parallel to channel encoding of the output triple of bits.

9. The method according to claim 7, wherein said output buffer comprises a physical output buffer, and wherein determining bit positions in the physical output buffer first comprises determining bit positions in a virtual circular output buffer associated with the physical output buffer.

10. The method according to claim 7, wherein said output buffer comprises a physical output buffer, and wherein the method further comprising determining, for each bit position, if the bit position falls within the physical output buffer for a transmission on the physical transmission channel.

11. The method according to claim 10, further comprising storing each bit of the output triple at the respective determined position in the physical output buffer, if the position falls within the physical output buffer, and otherwise discarding the bit.

12. A method for matching an amount of output bits from a channel encoding stage to a bit transmission rate of a physical transmission channel, the method comprising:
   determining, at the beginning of a transmission time interval for a transmission of one or more code blocks on the physical transmission channel, bit positions of interleaver padding bits in a virtual output buffer that buffers the output bits before transmission on the physical transmission channel;
   storing the determined padding bit positions;
   determining, based on the stored padding bit positions, positions of the output bits in the virtual output buffer, wherein the stored padding bit positions are re-used for each of the one or more code blocks;
   receiving from the channel encoding stage output bits comprising an output triple of bits;

determining, based on the positions of the output bits in the virtual output buffer, bit positions for each bit of the output triple in a physical output buffer for the physical transmission channel, wherein the determined bit positions are available when receiving the output triple.

13. A rate matching stage configured to match an amount of output bits from a channel encoding stage to a bit transmission rate of a physical transmission channel, the rate matching stage comprising:
- a first component configured to determine, at the beginning of a transmission time interval for a transmission of one or more code blocks on the physical transmission channel, bit positions of interleaver padding bits in an output buffer that buffers the output bits before transmission on the physical transmission channel;
- a second component configured to store the determined padding bit positions;
- a third component configured to determine, based on the stored padding bit positions, positions of the output bits from the channel encoding stage in the output buffer, wherein the stored padding bit positions are re-used for each of the one or more code blocks.

14. A rate matching stage configured to match an amount of output bits from a channel encoding stage to a bit transmission rate of a physical transmission channel, the rate matching stage comprising:
- a first component configured to receive an output triple of bits from the channel encoding stage; and
- a second component configured to determine bit positions for each bit of the output triple of bits in an output buffer for the physical transmission channel, wherein the determined bit positions are available when the first component receives the output triple.

15. A rate matching stage comprising:
- a first component configured to determine, at the beginning of a transmission time interval for a transmission of one or more code blocks on the physical transmission channel, bit positions of interleaver padding bits in a virtual output buffer that buffers the output bits before transmission on the physical transmission channel;
- a second component configured to store the determined padding bit positions;
- a third component configured to determine, based on the stored padding bit positions, positions of the output bits in the virtual output buffer, wherein the stored padding bit positions are re-used for each of the one or more code blocks; and
- a fourth component configured to receive from the channel encoding stage output bits comprising an output triple of bits;
- wherein the third component is further configured to determine, based on the positions of the output bits in the virtual output buffer, bit positions for each bit of the output triple in a physical output buffer for the physical transmission channel, wherein the determined bit positions are available when the fourth component receives the output triple.

16. The rate matching stage of claim 15, comprised in a mobile terminal.

17. The rate matching stage of claim 15, comprised in a radio base station of a mobile network.

* * * * *